(12) United States Patent
Wilson et al.

(10) Patent No.: US 8,136,544 B2
(45) Date of Patent: Mar. 20, 2012

(54) SEALING ARRANGEMENT WITH A SEGMENTED SEAL AND PRESSURE RELIEF

(75) Inventors: Rickey A. Wilson, Marshallville, OH (US); David L. Kraft, Canton, OH (US); Steven R. Fry, Lake Township, Stark County, OH (US)

(73) Assignee: Babcock & Wilcox Power Generation Group, Inc.

( * ) Notice: Subject to any disclaimer, the term of this patent is extended or adjusted under 35 U.S.C. 154(b) by 1252 days.

(21) Appl. No.: 11/839,357

(22) Filed: Aug. 15, 2007

(65) Prior Publication Data

US 2008/0042373 A1 Feb. 21, 2008

Related U.S. Application Data

(60) Provisional application No. 60/837,774, filed on Aug. 15, 2006.

(51) Int. Cl.
*F16K 11/10* (2006.01)

(52) U.S. Cl. ........ 137/240; 137/529; 137/512; 285/298; 122/7 R; 48/67

(58) Field of Classification Search ............. 137/240, 137/528, 529, 512, 469; 285/298; 122/7 R; 277/503, 505; 220/560.05, 721, 89.1; 48/67
See application file for complete search history.

(56) References Cited

U.S. PATENT DOCUMENTS 2,826,437 A * 3/1958 Detweiler et al. ............ 285/233
4,140,151 A * 2/1979 Van Becelaere .............. 137/526

* cited by examiner

*Primary Examiner* — John Rivell
*Assistant Examiner* — Time Aigbe
(74) *Attorney, Agent, or Firm* — Eric Marich

(57) ABSTRACT

A sealing apparatus adapted for use in a pressure vessel such as a synthesis gas cooler. The sealing apparatus is of a segmented plate construction formed around an outer wall section of a conduit means of the pressure vessel that defines at least part of a passage for receiving effluent from a gasification process. Pressure responsive mechanisms are provided on the plate segments to maintain the pressure difference across the sealing apparatus within the acceptable operating limits as well as to permit instantaneous pressure release to prevent damage to the pressure part assembly or cage. The seal is also maintained continuously through the differential growth movement between the conduit means and the pressure vessel during heat up and cool down cycles.

25 Claims, 5 Drawing Sheets

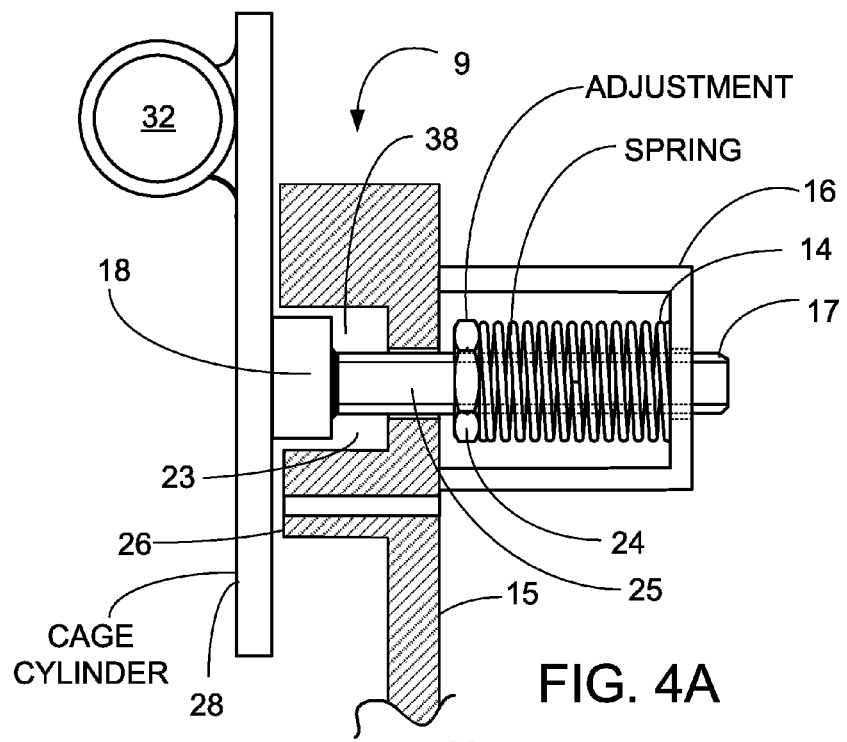
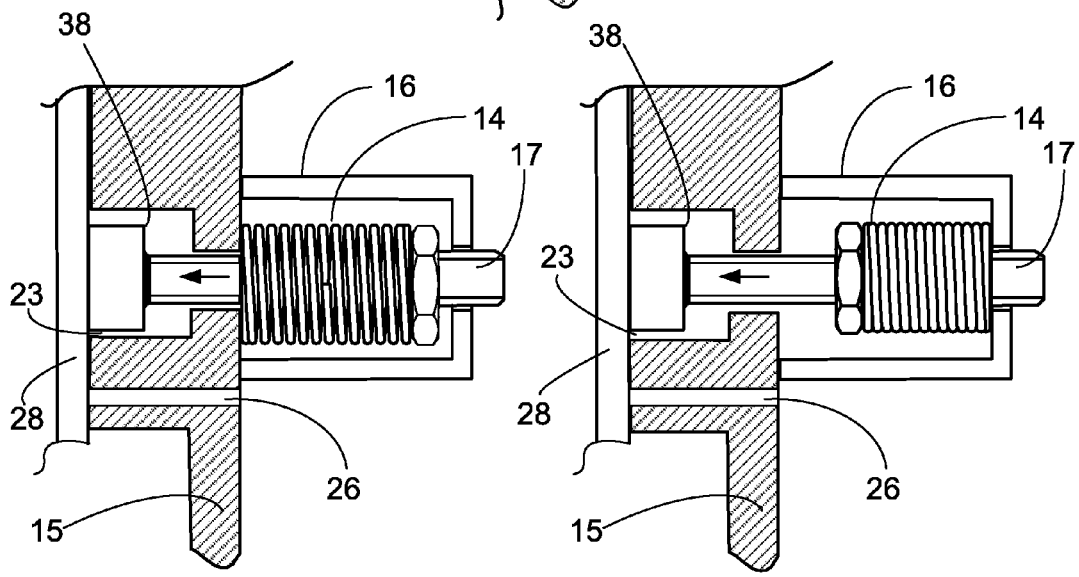
FIG. 4A
FIG. 4B  FIG. 4C

SEALING ARRANGEMENT WITH A SEGMENTED SEAL AND PRESSURE RELIEF

FIELD AND BACKGROUND OF THE INVENTION

The present invention relates in general to the field of coal gasification and, in particular, an apparatus for use with certain pressure vessels such as radiant syngas coolers (RSCs) to provide sealing between the hot syngas and the pressure vessel and to provide for instantaneous pressure relief against high differential pressures during transients.

A radiant syngas cooler (RSC) is a component of an integrated gasification combined cycle (IGCC) power plant. A stream of hot syngas and molten ash from the gasification process enters the top of the RSC, a vertical vessel. The RSC recovers heat from the syngas to generate steam, and removes most of the entrained solids. During normal operation, a seal must be maintained to prevent or minimize hot syngas from contacting certain parts of the vessel. During certain conditions, transient operating pressure excursions can occur which must be accommodated or relieved in order to protect conduit members which convey the synthesis gas within the vessel from being destroyed.

Various sealing devices with pressure release mechanisms have been developed. See, for example, U.S. Patent Application Publication No. US 2007/0119577, the text of which is hereby incorporated by reference as though fully set forth herein. None, however, disclose a sealing apparatus of a segmented ring construction positioned around an outer wall section of a conduit member with resiliently biased pressure device(s) or, pressure relief apparatus with resilient biased pressure for protection of the conduit member from high differential pressures.

SUMMARY OF THE INVENTION

It is an object of the present invention to provide a sealing apparatus for use in a pressure vessel for protection of the vessel shell and the back or outside of a conduit member from exposure to high syngas temperature and corrosive gases. The invention accommodates thermal and pressure differentials during operation. Another object of the present invention is to provide a pressure relief means for reducing pressure differential between opposite sides of a conduit member contained within the pressure vessel.

An exemplary sealing apparatus of the present invention comprises a flange member, ring segment retaining rods, ring segments, fastening members, and resilient members.

The flange member is preferably located concentric with and around the outer surface portion of the conduit member. The upper end of the flange member contains a slot for enclosing the segmented seal ring. The lower end is attached to the seal plate. Each seal ring segment is movably pressure loaded by at least one ring retaining rod. The plate segments are joined to each other preferably in a fluid tight manner, and are arranged around and overlap at least part of the conduit member along an axial direction as an elongated body or structure.

The retaining rods for the seal ring segments are held in position by fastening members that are attached in a fluid tight manner to the flange member. The resilient members are disposed between each fastening member and the respective ring segment to resiliently pressure or load the plate segments into a fluid tight relationship with the outer surface of the conduit member.

The pressure relief opening and a corresponding resiliently biased door are preferably provided on the flange member. The resiliently biased door is preferably located over and adapted to cover the pressure relief opening.

The other end of the plate segments is preferably attached in a fluid tight manner to a seal plate spaced at a distance from the conduit member.

The fluid tight connections formed between the various components of the sealing apparatus of the present invention and the pressure vessel provide a fluid tight seal between the opposite sides of the conduit member.

It is another object of the present invention to provide a pressure relieving apparatus with the resiliently biased door mounted on the flange member via at least one pair of spaced apart mounting assemblies. Each pair of door assemblies has one door each mounted on opposite sides of the flange member. The resilient members are arranged such that one door would open outwards and the opposite door would open inwards for opposite high differential pressure. Each mounting assembly preferably includes a rod member, a resilient member and a fastening member. One end of the rod member is attached to and extends outwardly from the surface of the plate segment. The resiliently biased door is movably mounted on each rod member, and the fastening member is mounted on the free end of the rod member to retain the resiliently biased door and the resilient member on the rod member. The mounting assemblies of each respective pair are preferably positioned opposite each other on opposite sides of the pressure relief opening.

The resiliently biased door is preferably adapted to close the pressure relief opening when the pressure differential is below a predetermined threshold value and to open and reduce the pressure differential when the pressure differential is equal to or exceeds the predetermined threshold value.

One problem solved by the present invention is the protection of the pressure vessel from the hot gas that contains corrosive compounds and protection of the heat absorbing pressure part cage (or conduit) from high differential pressures across the cage or between the hot gas volume and the annulus (or cavity) between the cage and the pressure vessel. The combination of the segmented seal ring with resiliently biased pressure and pressure relief doors with resiliently biased pressure responsive relief means is the complete assembly concept that prevents contact of the effluent gas with the inside wall of the pressure vessel, and allows for instantaneous pressure balance between the hot gas volume and the annulus.

In addition, the annulus is continuously purged with an inert gas to positively remove harmful gases from contacting the pressure vessel and to prevent the gases from entering the annulus volume. Too much purge flow is not desirable. The positive seal provided by the sealing apparatus of the present invention allows for placement of purge flow orifices to control the amount of inert purge gas.

The advantages offered by the segmented ring sealing apparatus with spring plate pressure relief of the present invention include but are not limited to:

There is a positive seal between the hot gas volume and the annulus between the cage and the pressure vessel, which keeps harmful gasification products away from the pressure vessel for corrosion protection and reduced exposure of high temperature gases on the pressure vessel;

The seal is maintained continuously through the differential growth movement between the cage and the pressure vessel during heat up and cool down cycles of the cooler; in addition, the seal is maintained for any lateral movement of the cage assembly that can be caused by ambient wind pressure loading on the outside of the pressure vessel;

The pressure differential between the hot gas volume and the annulus is minimized by the instantaneous pressure relief devices, which maintains the structural integrity of the cage; and The amount of annulus purge flow is controlled and access is provided for inspection and replacement of the devices.

The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIGS. 4A, 4B and 4C are a sectional views of FIG. 3 viewed in the direction of arrows 4-4 of FIG. 3, and illustrate various spring configurations.

DESCRIPTION OF THE PREFERRED EMBODIMENTS

Figure 1:
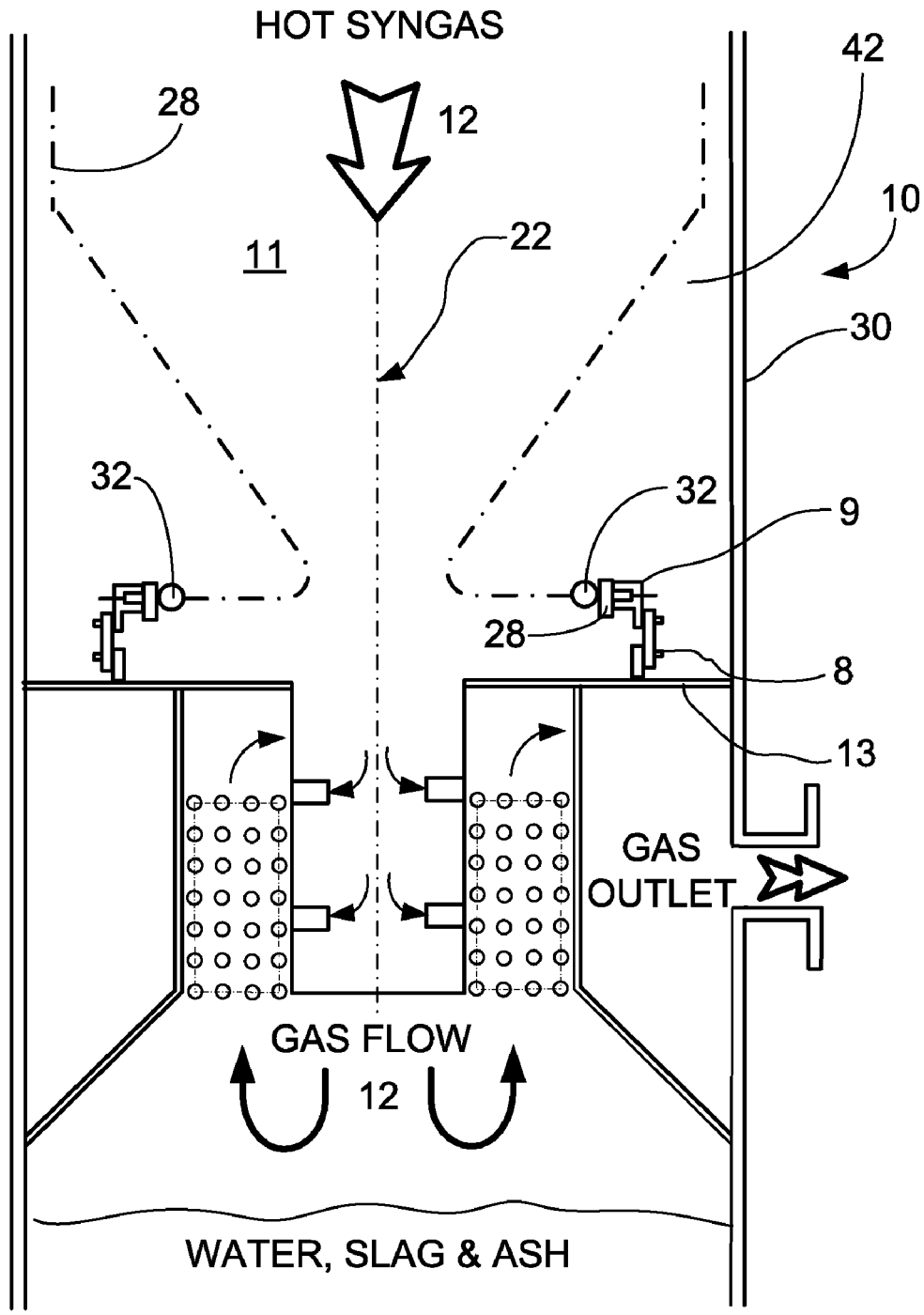
FIG. 1 is a sectional view of a sealing apparatus of the present invention installed inside a synthesis gas cooler.
Figure 2:
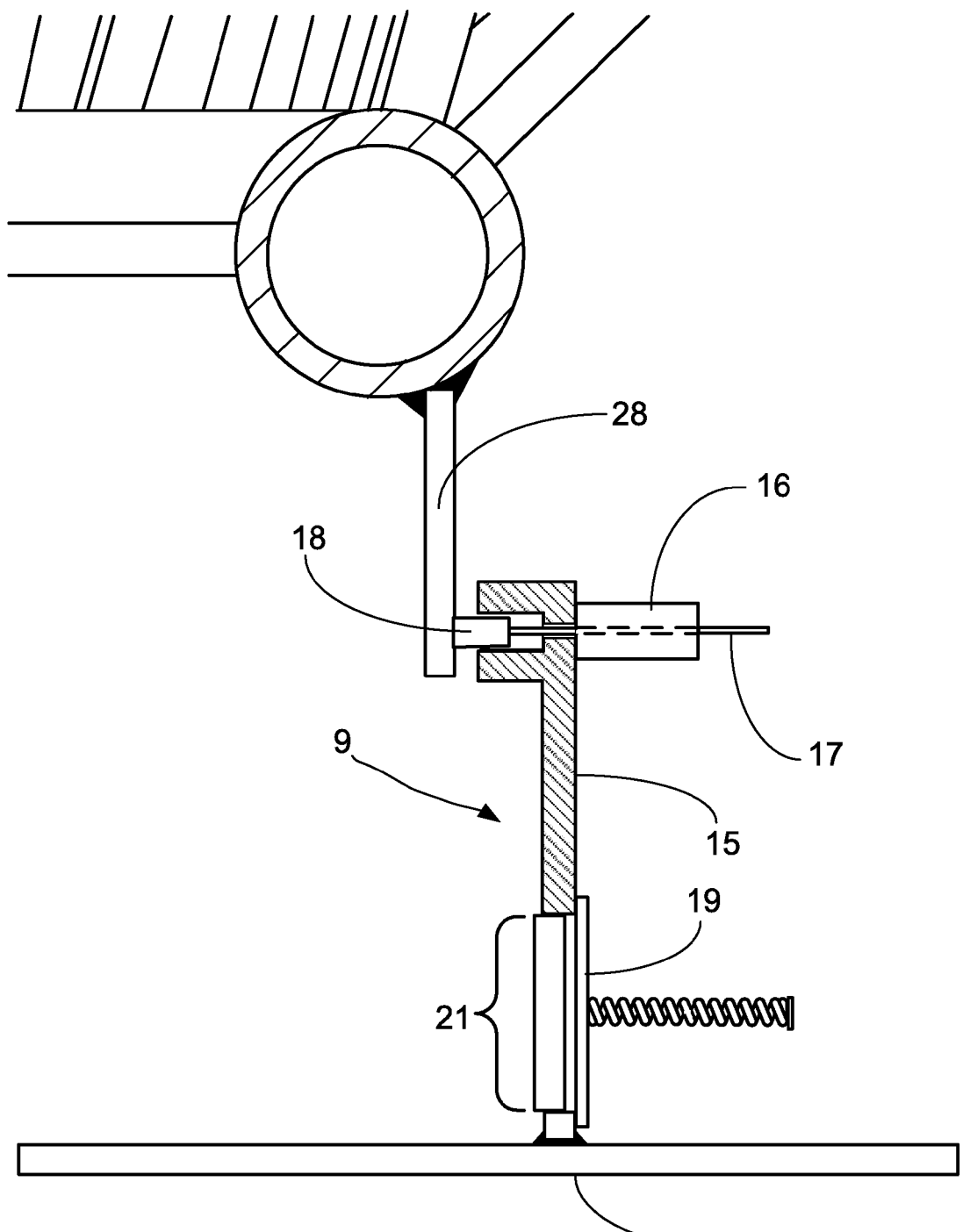
FIG. 2 is a sectional side view of a sealing apparatus of the present invention.

Referring now to the drawings, in which like reference numerals are used to refer to the same or similar elements, FIG. 1 shows a sealing apparatus 9 and pressure relief apparatus 8 of the present invention operatively installed in a pressure vessel 10 such as a synthesis gas cooler (SGC) 10. The pressure relief apparatus 8is adapted to reduce the pressure difference between opposite sides of a conduit member or cage 28 when a predetermined pressure differential is reached, and the sealing apparatus 9 is adapted to provide a fluid tight seal between a flue 11 defined by the conduit member 28 and an inner cavity 42 located between the conduit member 28 and an outer shell 30 of the SGC. The flue 11, as is shown in FIG. 1, is defined by the conduit member or cage 28, and typically comprises heat exchange elements such as fluid cooled tubes and/or radiant heat transfer surfaces. Synthesis gas or effluent 12 such as that produced by a gasification process is introduced into the flue 11 provided within the synthesis gas cooler 10. A purge gas may be selectively introduced into the cavity 42 defined by the conduit member 28 and the outer shell 30 to remove any effluent 12 that might enter the cavity 42 to prevent or reduce corrosion and exposure to high gas temperatures of the wall of the outer shell 30 or the surfaces disposed within the cavity 42.

As shown in FIG. 1, although other arrangements are possible, the sealing apparatus 9 contacts on one end to a lower outer surface portion of the conduit member 28 and is mounted to a seal plate 13 on the other end. FIGS. 4A, 4B and 4C show by way of non-limiting example a conduit member 28 with a lower header 32 attached to its inner surface and the sealing apparatus 9 attached its outer surface. Other possible arrangements for the sealing apparatus 9 are shown in FIGS. 2 and 4A, 4B and 4C.

Referring to FIG. 1, while other arrangements are possible, the pressure relief apparatus 8 is mounted on a flange member 15 of the sealing apparatus 9.

The predetermined threshold pressure value at which the pressure relief apparatus 8 activates is preferably selected such that the pressure differential across the sealing apparatus 9 does not impair or compromise the structural integrity of the conduit member or cage 28 and/or the seal plate 13. Alternatively, the predetermined threshold pressure value may be selected such that the pressure differential does not cause the walls of the conduit member or cage 28 and/or the seal plate 13 to fail and release the effluent 12 into the cavity 42.

The conduit member 28 preferably has a cross sectional shape corresponding to that of the outer shell 30. However, the conduit member 28 may have any suitable shape or configuration, and any suitable dimension for its intended application.

Referring now to FIGS. 2 and 4A, 4B and 4C, there are shown sectional side views of the sealing apparatus 9 of the present invention which comprises a flange member 15, spaced apart plate retaining rods 17, seal ring segments 18, fastening members 16, resilient members 14, one or more pressure relief openings 21, and door plate assemblies with resiliently biased doors 19.

The seal ring segments 18 are preferably located on and extend around a lower outer surface portion of the conduit member 28 in a plane perpendicular to the central conduit axis 22 (see FIG. 1). The ring retaining rods 17 are preferably attached to and extend outwardly from the peripheral surface 38 of the seal ring segments 18. The flange member 15 preferably has a slot 23 formed on one end thereof for receiving the seal ring segments 18 and at least one fastening bore 25 opening into the groove 23 for receiving one of the retaining rods 17. Each seal ring segment 18 is movably mounted on at least one plate retaining rod 17.

Figure 3:
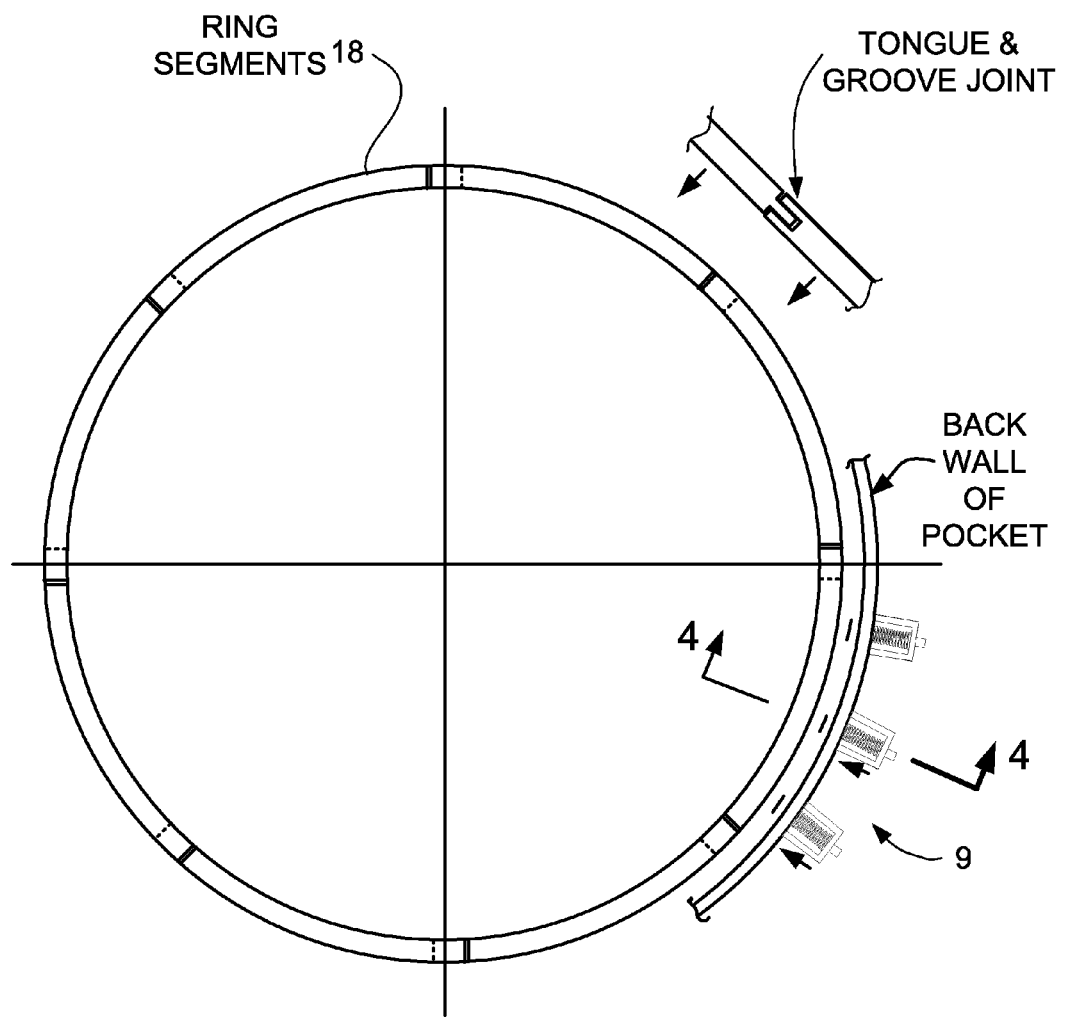
FIG. 3 is a top plan view of a sealing apparatus of the present invention.

The seal ring segments 18 are preferably joined to each other in a fluid tight manner, and are arranged around and overlap at least part of the conduit member 28 along a lengthwise direction as an elongated body or structure. The flange member 15 may be provided with one or more port holes 26 to provide a flow path for the purge gas. Pressure applied to seal ring segments 18 may be applied by either compressing or extending the resilient member 14 from its neutral position when the pressure differential is lower than the predetermined threshold value. The neighboring seal ring segments 18 are preferably joined to each other via a tongue and groove interlocking structure, as illustrated in FIG. 3.

The fastening members 16 are mounted on the flange member 15 and are adapted to retain the seal ring plate segment 18 with the slot 23 on the retaining rod 17. Preferably, the fastening member 16 is threadably mounted on the retaining rod 17 and is axially displaceable along the retaining rod 17 for adjusting biasing force exerted by the resilient member 14 against the seal ring segments 18. It will be appreciated that instead of using the fastening member 16 to adjust the tension or force of the resilient member 14, a tension adjusting member 24, disposed between the fastening member 16 and the flange member 15 may be used.

The resilient members 14 are disposed between each fastening member 16 and the respective seal ring segment 18 to resiliently pressure or load the seal ring segments 18 into a fluid tight relationship with the outer surface of the conduit member 28. Examples of resilient members include coil springs made of metal, plastic or other suitable material for the pressure and temperature conditions expected.

Figure 5:
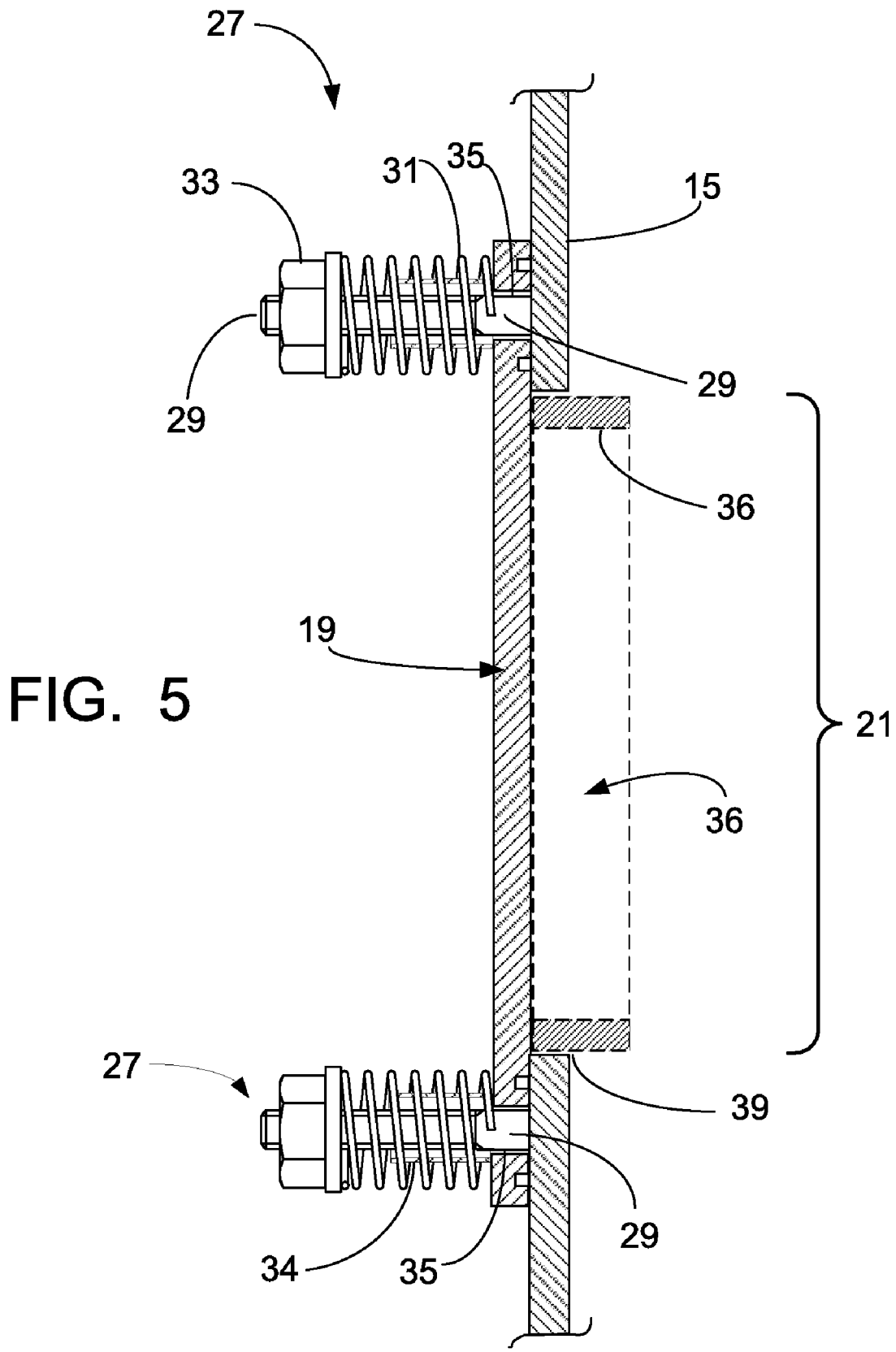
FIG. 5 is a partial sectional side view of a plate segment of the present invention with a pressure release assembly.

Referring to FIG. 5, the pressure relief opening 21 and the corresponding resiliently biased door 19 are preferably provided on the flange member 15. The resiliently biased door 19 is preferably located over and adapted to cover the pressure relief opening 21.

The other end of the flange member 15 is preferably attached in a fluid tight manner to a seal plate 13 spaced at a distance from the conduit member 28. Preferably, the seal plate 13 is arranged perpendicular to the central conduit axis 22.

The fluid tight connections formed between the various components of the sealing apparatus 9 of the present invention and conduit 28 10 provide a fluid tight seal between the opposite sides of the conduit member 28, at least when the pressure difference across the conduit member 28 is within or below a predetermined threshold value(s).

The resiliently biased door plate assembly allows immediate pressure release during pressure excursions by means of the spring assemblies allowing the door 19 to open as required. Labyrinth seals may be employed to create additional sealing capabilities when the door 19 is in the closed position. Additional plate sleeves or stud sleeves may be used to act as a load leveling device in the event a twist in the door action becomes an issue (see FIG. 5). The resiliently biased door 19 of the door plate assembly is preferably adapted to close the pressure relief opening 21 when the pressure differential is below a predetermined threshold value and to open and reduce the pressure differential when the pressure differential is equal to or exceeds the predetermined threshold value.

In an embodiment, the conduit member 28 has a substantially circular cross section and the seal ring segments 18 are provided with an arcuate configuration with a rectangular configuration in cross-section to conform to the outer surface of the conduit member 28. Although the number of seal ring segments 18 can vary, depending on, for example, the cross sectional size of the conduit member 28 or the operating parameters of the sealing apparatus 9, the preferred number of seal ring segments 18 ranges from 2 to 10. It will be appreciated that more or fewer seal ring segments 18 can also be used. The seal ring segments 18 may all be substantially the same width or may comprise a variety of different widths. A sealing apparatus 9 of the present invention with 8 such seal ring segments 18 is shown in FIG. 3.

Referring now to FIG. 5, the resiliently biased doors 19 are preferably mounted on the flange member 15 via at least one pair of spaced apart mounting assemblies 27. Each mounting assembly 27 preferably includes a rod member 29, a resilient member 31 (e.g., a coil spring) and a fastening member 33. One end of the rod member 29 is attached to and extends outwardly from the surface of the flange member 15. The resiliently biased door 19 is movably mounted on the rod member 29 via opening 35, and the fastening member 33 is mounted on the free end of the rod member 29 to retain the resiliently biased door 19 and the resilient member 31 on the rod member 29. The mounting assemblies 27 of each respective pair are preferably positioned opposite each other on opposite sides of the pressure relief opening 21. The resiliently biased door 19 preferably overlaps the edge extending around the pressure relief opening 21 and/or is in intimate surface contact with the outer surface of the flange member 15.

As shown in FIG. 5, a stud/guide sleeve 34 may be inserted between the resilient member 31 and the rod member 29 to permit even movement of the resiliently biased door 19. A sleeve member 36 may also be provided on the side/surface of the door 19 facing the flange member 15. The sleeve member 36 preferably abuts against a portion 39 of the pressure relief opening 21 to allow even movement of the resiliently biased door 19. The stud/guide sleeve 34 or the sleeve member 36 may be used alone or together, as required.

While specific embodiments of the invention have been shown and described in detail to illustrate the application of the principles of the invention, it will be understood that the invention may be embodied otherwise without departing from such principles.

We claim:

1. A sealing apparatus for accommodating pressure differential between opposite sides of a conduit member contained within a pressure vessel, the sealing apparatus comprising:
   seal ring segments located on and extending around a lower outer surface portion of the conduit member in a plane perpendicular to a central conduit axis;
   a plurality of spaced retaining rods located on and extending outwardly from a peripheral surface of the seal ring segments;
   a flange member having a slot formed on one end thereof for receiving the seal ring segments and at least one fastening bore opening into the slot for receiving one of the retaining rods therein, each seal ring segment being movably mounted on at least one ring retaining rod, the neighboring seal ring segments being joined to each other to form first fluid tight connections, the seal ring segments being arranged around and overlapping at least part of the conduit member along a lengthwise direction as an elongated body;
   a first fastening member mounted on and adapted to retain the one end of each seal ring segment on the retaining rod; and
   a first resilient member disposed between each first fastening member and the respective seal ring segment to resiliently load the seal ring segments against the conduit member to form second fluid tight connections;
   a plurality of pressure relief openings formed in the flange member; and
   a resiliently biased door located over and covering the pressure relief opening,
   wherein the other end of the flange member is attached to a seal plate spaced at a distance from the conduit member to form third fluid tight connections,
   wherein the first, second and third fluid tight connections form a fluid tight seal between opposite sides of the conduit member, and
   wherein the resiliently biased door is adapted to close the pressure relief opening when the pressure differential is below a predetermined threshold pressure value and to open and reduce the pressure differential when the pressure differential is equal to or exceeds the predetermined threshold pressure value.

2. The sealing apparatus of claim 1, wherein the pressure vessel is a synthesis gas cooler and the conduit member is adapted to receive an effluent produced by a gasification process.

3. The sealing apparatus of claim 1, wherein the conduit member has a circular cross sectional shape and wherein the seal ring segments have an arcuate configuration to conform to the surface of the conduit member.

4. The sealing apparatus of claim 1, wherein the seal ring segments have substantially the same width.

5. The sealing apparatus of claim 1, wherein the seal ring segments have different widths.

6. The sealing apparatus of claim 1, wherein the seal ring segments have an arcuate configuration with a rectangular configuration in cross-section.

7. The sealing apparatus of claim 1, wherein the seal ring segments have a circular arcuate configuration.

8. The sealing apparatus of claim 1, wherein the first fastening member is axially displaceable along the retaining rod for adjusting biasing force exerted by the first resilient member against the seal ring segments.

9. The sealing apparatus of claim 1, further comprising a tension adjusting member disposed on the retaining rod for adjusting biasing force exerted by the first resilient member against the plate member.

10. The sealing apparatus of claim 2, wherein at least one seal ring segment further comprises a port hole for providing a flow path for purge gas when the at least one seal ring segment is displaced outward from the flange member due to a relative movement between the conduit member and the pressure vessel.

11. The sealing apparatus of claim 1, wherein the neighboring seal ring segments are joined via a tongue and groove interlocking structure.

12. The sealing apparatus of claim 1, wherein the resiliently biased door is mounted on the flange member via at least one pair of spaced apart mounting assemblies each having a rod member, a second resilient member and a second fastening member,
    wherein one end of the rod member is attached to and extends outwardly from the flange member,
    wherein the resiliently biased door is movably mounted on each rod member of the mounting assemblies,
    wherein the second fastening member is mounted on the other end of the rod member to retain the resiliently biased door and the second resilient member on the rod member, and
    wherein the mounting assemblies of each pair are positioned opposite each other on opposite sides of the pressure relief opening.

13. The sealing apparatus of claim 1, wherein the resiliently biased door overlaps an edge extending around the pressure relief opening.

14. The sealing apparatus of claim 1, wherein the second resilient member is a coil spring.

15. The sealing apparatus of claim 12, wherein the first resilient member is a coil spring.

16. The sealing apparatus of claim 1, wherein the resiliently biased door is arranged in intimate surface contact with the outer surface of the flange member.

17. The sealing apparatus of claim 12, further comprising a guide sleeve axially disposed between the second resilient member and the rod member to permit even movement of the resiliently biased door.

18. The sealing apparatus of claim 16, wherein the resiliently biased door comprises a guide sleeve opening adapted to receive the guide sleeve.

19. The sealing apparatus of claim 11, further comprising a sleeve member disposed on a side of the resiliently biased door facing the plate segment and abutting against at least part of an inner surface of the pressure relief opening, to permit even movement of the resiliently biased door.

20. The sealing apparatus of claim 19, wherein the sleeve member abuts against the entire inner surface of the pressure relief opening.

21. The sealing apparatus of claim 2, wherein a purge gas is selectively introduced into a cavity defined by the conduit member and the pressure vessel to remove any effluent that has entered the cavity.

22. The sealing apparatus of claim 1, wherein the predetermined threshold pressure value is selected such that the pressure differential does not impair the structural integrity of the conduit member or the seal plate.

23. The sealing apparatus of claim 1, wherein the predetermined threshold pressure value is selected such that the pressure differential does not cause the seal plate to fail and release the effluent into the cavity.

24. The sealing apparatus of claim 1, wherein the elongated body comprises 2-10 seal ring segments, and wherein each seal ring segment is mounted on at least one retaining rod.

25. The sealing apparatus of claim 2, wherein the seal ring segments remain in contact with the conduit member.

* * * * *